United States Patent

Ikeda

[11] 4,025,167
[45] May 24, 1977

[54] TELEPHOTO-TYPE ZOOM LENS SYSTEM
[75] Inventor: Yoshitsugi Ikeda, Hachiouji, Japan
[73] Assignee: Olympus Optical Co., Ltd., Tokyo, Japan
[22] Filed: Jan. 30, 1975
[21] Appl. No.: 545,750
[30] Foreign Application Priority Data
Feb. 4, 1974 Japan .................. 49-14290
[52] U.S. Cl. .................. 350/184; 350/176; 350/177
[51] Int. Cl.² .......................... G02B 15/14
[58] Field of Search ............. 350/184, 176, 177
[56] References Cited
UNITED STATES PATENTS 3,615,125 10/1971 Higuchi et al. ............ 350/184
3,743,384 7/1973 Nakamura ................. 350/184
3,770,341 11/1973 Itah ........................ 350/177 X Primary Examiner—Paul A. Sacher
Attorney, Agent, or Firm—Cushman, Darby & Cushman

[57] ABSTRACT

A telephoto-type zoom lens system comprising a first lens group utilized for focusing, a second lens group which is a variator, a third lens group which is a compensator, and a fourth lens group which is a relay lens system, said first lens group being arranged so that variation of aberrations is small when it is moved for focusing, aberrations caused by said first lens group being corrected by the other lens groups, said telephoto-type zoom lens system thus having aberrations favorably corrected for the whole range of photographing distances.

4 Claims, 21 Drawing Figures

SPHERICAL ABERRATION
f=85.0

SPHERICAL ABERRATION
f=151.4

SPHERICAL ABERRATION
f=250.0

TELEPHOTO-TYPE ZOOM LENS SYSTEM

BACKGROUND OF THE INVENTION

1. Field of the Invention:

The present invention relates to a telephoto-type zoom lens system and, more particularly, to a telephoto-type zoom lens system free from aggravation of aberrations for the whole range of photographing distances from the infinite distance to short distance.

2. Description of the Prior Art:

Some of known zoom lens systems in general are arranged to be focused by the first lens group. That is, the first lens group is advanced for focusing according to the photographing distance. This kind of focusing method, however, has a disadvantage that aberrations are aggravated considerably when the photographing distance changes as in the case of the front-lens group advancing method adopted for low-cost cameras. If, however, the lens system as a whole is advanced for focusing, in case of zoom lens systems, it is impossible to keep the focusing position constant in the zooming range. Therefore, the focusing method to advance the lens system as a whole cannot be adopted for zoom lens systems, and the focusing method to advance the front lens group is generally adopted.

Besides, the shortest possible photographing distance for zoom lens systems is usually decided at a constant distance for the whole zooming range. Therefore, even when the magnification for photographing on the short focal length side is small, the magnification for photographing on the long focal length side becomes large and, consequently, aggravation of aberrations on the long focal length side becomes necessarily large. Especially in telephoto-type zoom lens systems, aggravation of spherical aberration is conspicuous and, as a result, decrease of quality of the image and change of the focusing position are caused in the zooming range.

As a method to solve the above-mentioned problem in focusing of zoom lens systems, it may be considered to satisfactorily correct aberrations within the first lens group. In that case, however, it is necessary to adopt a first lens group of complicated arrangement and, as a result, the overall length of the lens system necessarily becomes long, weight of the lens system increases and, moreover, the lens system becomes extremely expensive. Therefore, this method is not practical for zoom lens systems for still-photographic cameras.

It may be also considered to solve the above-mentioned problem by dividing the first lens group into two lens components and to thereby correct aberrations in cases of close-up photographing. This method, however, is not preferable in practice to zoom lens systems for still-photographic cameras due to reasons same as the case of the above-mentioned method.

The most preferable method for solving the above-mentioned problem may be to arrange the first lens group by two or three lenses and to thereby reduce aggravation of aberrations in close-up photographing. Zoom lens systems of this kind of arrangement has excellent performance for photographing an object at the infinite distance. In close-up photographing, however, quality of the image decreases and, in addition, change of the focusing position in the zooming range becomes large. These disadvantages are caused by the fact that it is substantially impossible to favourably correct aberrations of the first lens group when a lens group of simple arrangement is adopted as the first lens group.

SUMMARY OF THE INVENTION

It is, therefore, a primary object of the present invention to provide a telephoto-type zoom lens system comprising a first lens group arranged to move along the optical axis at the time of focusing and, at the same time, arranged so that aberrations of said first lens group will not be varied even when said first lens group is moved for focusing.

The telephoto-type zoom lens system according to the present invention comprises an afocal lens system comprising three lens groups, i.e., a first lens group having function as a convex lens, a second lens group having function as a concave lens, and a third lens group having function as a convex lens, and a relay lens system comprising a fourth lens group, magnification of said zoom lens system being varied by moving said second lens group along the optical axis of the lens system, the position of the imaging plane of said zoom lens system being kept constant by moving said third lens group, said first lens group to be moved for focusing being arranged by two lens components of three lenses, i.e., a first lens component which is a biconvex lens and a second lens component which is a cemented doublet lens consisting of a biconvex lens and biconcave lens cemented to each other. Moreover, the telephoto-type zoom lens system according to the present invention satisfies the following conditions when reference symbols $n_1$, $n_2$ and $n_3$ respectively represent refractive indexes of respective lenses constituting said first lens group, reference symbols $r_1$ through $r_5$ respectively represent radii of curvature of respective surfaces of said lenses in the order from the object side toward the image side, and reference symbol $f_1$ represents the total focal length of said first lens group.

$$0.3 < \frac{n_1 - 1}{r_1} f_1 < 0.58 \tag{1}$$

$$0.35 < -\frac{r_1}{r_2} < 0.65 \tag{2}$$

$$0.57 < \frac{n_2 - 1}{r_3} f_1 < 0.75 \tag{3}$$

$$0.1 < \frac{n_3 - 1}{r_5} f_1 < 0.24 \tag{4}$$

Out of the above conditions defining the first lens group of the zoom lens system arranged as described in the above, conditions (1) and (2) are to define the first lens component. Out of them, the condition (1) defines the refractive power of the first surface $r_1$ of the lens group. The condition (2) relates to the radius of curvature of the second surface $r_2$ of the lens group when the refractive power of the first surface $r_1$ is defined by the condition (1).

If it becomes $[(n_1 - 1)/r_1]f_1 < 0.3$ in said condition (1), aggravation of spherical aberration caused by change of the photographing distance at the time of focusing will become small. As, however, the absolute value of astigmatism becomes large in that case, it becomes impossible to favourably correct astigmatism in case of the lens group comprising three lenses and, therefore, it becomes very difficult to favourably correct astigmatism of the lens system as a whole unless the other lens groups are made complicated. If it becomes $[(n_1 - 1)/r_1]f_1 > 0.58$ on the contrary, aggravation of spherical aberration at the time of focusing becomes large and, especially, it becomes extremely large at the time when the focal length is maximum.

If it becomes $-r_1/r_2 < 0.35$ in the condition (2), aggravation of spherical aberration caused by change of the photographing distance becomes large even when the condition (1) is satisfied. In case of $-r_1/r_2 > 0.65$, astigmatism is aggravated through aggravation of spherical aberration becomes small.

Conditions (3) and (4) relate to refractive powers of the front surface $r_3$ and rear surface $r_5$ of the second lens component arranged by leaving a small airspace from the first lens component. If it becomes $[(n_2 - 1)/r_3]f_1 < 0.57$ in the condition (3) related to the refractive power of the surface $r_3$, aggravation of spherical aberration caused by change of the photographing distance becomes large. In case of $[(n_2 - 1)/r_3]f_1 > 0.75$, astigmatism is aggravated though aggravation of spherical aberration is small.

As for the condition (4), aggravation of spherical aberration will become small when the refractive power is made small as $[(n_3 - 1)/r_5]f_1 < 0.1$. In that case, however, astigmatism cannot be corrected favourably. If the refractive power is made large as $[(n_3 - 1)/r_5]f_1 > 0.24$, aggravation of spherical aberration caused by change of the photographing distance becomes large.

When, as described in the above, the first lens group does not satisfy the afore-mentioned respective conditions, aggravation of spherical aberration at the time of focusing becomes large, or considerably large aberrations will be caused by the first lens group and it will become very difficult to correct them by the other lens groups. In the above, the second lens component is described as a cemented doublet lens. This lens component, however, may be also arranged as a biconvex lens and biconcave lens spaced from each other by a small airspace.

DETAILED DESCRIPTION OF THE PREFERRED EMBODIMENTS

Figure 1:
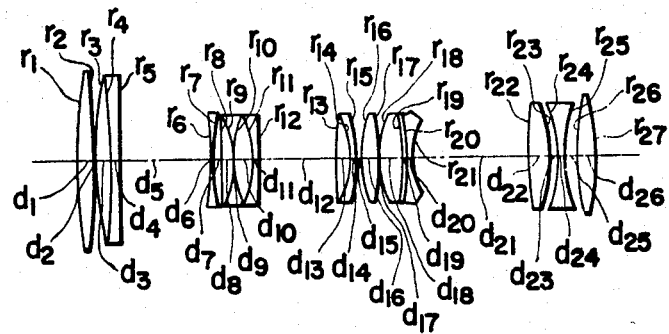
FIG. 1 through FIG. 3 respectively show sectional views of respective embodiments of the telephoto-type zoom lens system according to the present invention.
Figure 2:
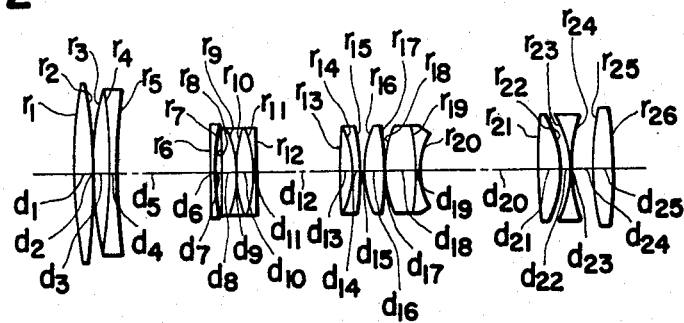
Figure 3:
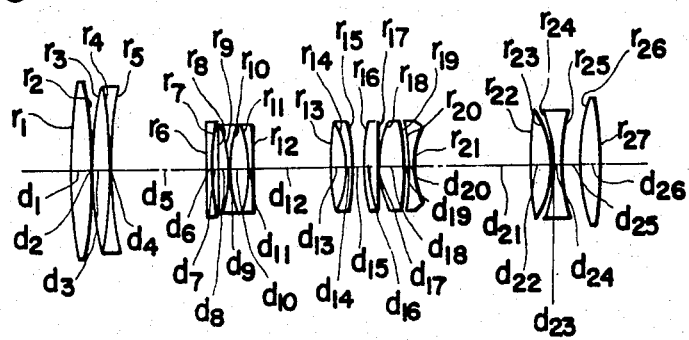

Preferred embodiments of the telephoto-type zoom lens system according to the present invention are as described below. These embodiments are of course arranged so that their first lens groups respectively satisfy the afore-mentioned conditions. Moreover, in order to make the lens system as a whole extremely compact so that its telephoto ratio (the value obtained by dividing the distance from the first lens surface of the lens system to the imaging plate by the focal length of the lens system as a whole) becomes smaller than 1, the varifocal afocal lens system of every embodiment is made small and the fixed relay lens system is also arranged compactly. Besides, for every embodiment, respective lens groups other than the first lens group are also arranged so that the quality of the image becomes favourable over the whole varifocal range and whole focusing range. That is, for every embodiment, the second lens group, i.e., the variator is arranged to have an extremely short focal length and is arranged by four lenses, i.e., a concave lens, a cemented doublet lens consisting of a convex lens and concave lens, and a concave lens in order to prevent aberrations. The third lens group, i.e., the compensator is arranged by using a cemented doublet lens consisting of a convex lens and concave lens. The fourth lens group, i.e., the fixed relay lens system is arranged by using a first lens component of a convex lens, a second lens component arranged as a cemented doublet lens consisting of a convex lens and concave lens or as a combined lens component consisting of a convex lens and concave lens spaced from each other by a small airspace, a third lens component of a convex lens positioned at some distance from said second lens component, a fourth lens component of a concave lens, and a fifth lens component of a convex lens.

Embodiment 1
$f = 86.5 \sim 250.0$
$F = 1 : 5$
l (Overall length: distance from the first lens surface to the imaging surface)
= 232.49
p (Telephoto ratio at the time of f = 2500 mm) = 0.93
$r_1 = 138.961$
  $d_1 = 6.25$    $n_1 = 1.48749$    $\nu_1 = 70.2$
$r_2 = -306.308$
  $d_2 = 0.58$
$r_3 = 122.382$
  $d_3 = 5.78$    $n_2 = 1.62299$    $\nu_2 = 58.1$
$r_4 = -221.461$
  $d_4 = 2.40$    $n_3 = 1.78472$    $\nu_3 = 25.7$
$r_5 = 504.707$
  $d_5 = D_1$
$r_6 = -738.315$
  $d_6 = 1.70$    $n_4 = 1.56873$    $\nu_4 = 63.2$
$r_7 = 75.815$
  $d_7 = 1.50$
$r_8 = 718.424$
  $d_8 = 4.00$    $n_5 = 1.76180$    $\nu_5 = 27.1$
$r_9 = -52.778$
  $d_9 = 1.50$    $n_6 = 1.62299$    $\nu_6 = 58.1$
$r_{10} = 67.332$
  $d_{10} = 4.50$
$r_{11} = -46.001$
  $d_{11} = 1.70$    $n_7 = 1.56384$    $\nu_7 = 60.8$
$r_{12} = -253.441$
  $d_{12} = D_2$
$r_{13} = 177.012$
  $d_{13} = 5.50$    $n_8 = 1.61800$    $\nu_8 = 63.4$
$r_{14} = -35.277$
  $d_{14} = 1.50$    $n_9 = 1.72342$    $\nu_9 = 38.0$
$r_{15} = -87.628$
  $d_{15} = D_3$
$r_{16} = 39.044$
  $d_{16} = 5.67$    $n_{10} = 1.49831$    $\nu_{10} = 65.0$
$r_{17} = -1006.691$
  $d_{17} = 0.60$
$r_{18} = 32.847$
  $d_{18} = 8.61$    $n_{11} = 1.54739$    $\nu_{11} = 53.6$
$r_{19} = -115.909$
  $d_{19} = 0.91$
$r_{20} = 107.102$
  $d_{20} = 2.52$    $n_{12} = 1.80610$    $\nu_{12} = 40.9$
$r_{21} = 26.393$
  $d_{21} = 39.00$
$r_{22} = 101.736$
  $d_{22} = 7.17$    $n_{13} = 1.59551$    $\nu_{13} = 39.2$
$r_{23} = -38.824$
  $d_{23} = 1.50$
$r_{24} = -36.459$
  $d_{24} = 2.00$    $n_{14} = 1.72000$    $\nu_{14} = 43.7$
$r_{25} = 68.595$
  $d_{25} = 3.50$
$r_{26} = 72.873$
  $d_{26} = 5.61$    $n_{15} = 1.55671$    $\nu_{15} = 58.6$
$r_{27} = -115.433$ -continued Embodiment 1

$$\frac{n_1 - 1}{r_1} f_1 = 0.442$$

$$-\frac{r_1}{r_2} = 0.454$$

$$\frac{n_2 - 1}{r_3} f_1 = 0.641$$

$$\frac{n_3 - 1}{r_5} f_1 = 0.196$$

| f | $D_1$ | $D_2$ | $D_3$ |
|---|---|---|---|
| 86.5 | 1.74 | 44.22 | 14.46 |
| 151.4 | 31.76 | 27.07 | 1.59 |
| 250.0 | 47.53 | 1.03 | 11.86 |

$f_1$ (Focal length of first lens group) = 126.05
$f_2$ (Focal length of second lens group) = 40.00
$f_3$ (Focal length of third lens group) = 115.05
$f_4$ (Focal length of fourth lens group) = 138.20 where reference symbols $r_1$ through $r_{27}$ represent radii of curvature of successive lenses, reference symbols $d_1$ through $d_{28}$ represent thickness of successive lenses and distances between lenses on the axis, reference symbols $n_1$ through $n_{15}$ represent refractive indexes of successive lenses, $\nu_1$ through $\nu_{15}$ represent Abbe's number of successive lenses.

Embodiment 2
$f = 85.0 \sim 250.0$
$F = 1 : 5$
$l = 238.36$
$p = 0.95$
$r_1 = 152.515$
  $d_1 = 6.27$     $n_1 = 1.48749$     $\nu_1 = 70.2$
$r_2 = -291.307$
  $d_2 = 0.59$
$r_3 = 121.674$
  $d_3 = 5.80$     $n_2 = 1.62041$     $\nu_2 = 60.3$
$r_4 = -222.315$
  $d_4 = 2.41$     $n_3 = 1.78472$     $\nu_3 = 25.7$
$r_5 = 583.052$
  $d_5 = D_1$
$r_6 = -569.430$
  $d_6 = 1.70$     $n_4 = 1.56873$     $\nu_4 = 63.2$
$r_7 = 83.352$
  $d_7 = 2.00$
$r_8 = \infty$
  $d_8 = 4.00$     $n_5 = 1.76182$     $\nu_5 = 26.6$
$r_9 = -52.450$
  $d_9 = 1.50$     $n_6 = 1.61800$     $\nu_6 = 63.4$
$r_{10} = 69.088$
  $d_{10} = 4.51$
$r_{11} = -47.831$
  $d_{11} = 1.7$     $n_7 = 1.56873$     $\nu_7 = 63.2$
$r_{12} = -267.438$
  $d_{12} = D_2$
$r_{13} = 158.234$
  $d_{13} = 5.52$     $n_8 = 1.62012$     $\nu_8 = 49.7$
$r_{14} = -35.438$
  $d_{14} = 1.51$     $n_9 = 1.72151$     $\nu_9 = 29.2$
$r_{15} = -94.092$
  $d_{15} = D_3$
$r_{16} = 42.042$
  $d_{16} = 5.67$     $n_{10} = 1.49831$     $\nu_{10} = 65.0$
$r_{17} = -325.217$
  $d_{17} = 0.60$
$r_{18} = 37.123$
  $d_{18} = 10.60$     $n_{11} = 1.54739$     $\nu_{11} = 53.6$
$r_{19} = -107.794$
  $d_{19} = 2.52$     $n_{12} = 1.80610$     $\nu_{12} = 40.9$
$r_{20} = 8.663$
  $d_{20} = 39.00$
$r_{21} = 100.383$
  $d_{21} = 7.17$     $n_{13} = 1.59551$     $\nu_{13} = 39.2$
$r_{22} = -43.650$
  $d_{22} = 3.00$
$r_{23} = -38.740$
  $d_{23} = 2.05$     $n_{14} = 1.72000$     $\nu_{14} = 43.7$
$r_{24} = 91.922$
  $d_{24} = 7.50$
$r_{25} = 78.964$ -continued Embodiment 2
  $d_{25} = 6.00$     $n_{15} 1.56384$     $\nu_{15} = 60.8$
$r_{26} = -200.325$

| f | $D_1$ | $D_2$ | $D_3$ |
|---|---|---|---|
| 85.0 | 1.03 | 45.0 | 16.71 |
| 151.4 | 32.28 | 27.54 | 3.00 |
| 250.0 | 48.06 | 1.49 | 13.27 |

$f_1 = 126.55$     $f_2 = -40.00,$     $f_3 = 115.55$
$f_4 = 138.25$ where reference symbols $r_1$ through $r_{26}$ represent radii of curvature of successive lenses, reference symbols $d_1$ through $d_{25}$ represent thickness of successive lenses and distance between lenses on the axis, reference symbols $n_1$ through $n_{15}$ represent refractive indexes of successive lenses, $\nu_1$ through $\nu_{15}$ represent Abbe's number of successive lenses.

Embodiment 3
$f = 87.0 \sim 250.0$
$l = 237.27,$     $F = 1 : 5$
$p = 0.95$
$r_1 = 168.255$
  $d_1 = 6.25$     $n_1 = 1.48749$     $\nu_1 = 70.2$
$r_2 = -281.979$
  $d_2 = 0.58$
$r_3 = 118.717$
  $d_3 = 5.78$     $n_2 1.62041$     $\nu_2 = 60.3$
$r_4 = -221.405$
  $d_4 = 2.40$     $n_3 = 1.78472$     $\nu_3 = 25.7$
$r_5 = 660.538$
  $d_5 = D_1$
$r_6 = -1282.312$
  $d_6 = 1.70$     $n_4 = 1.56873$     $\nu_4 = 63.2$
$r_7 = 76.677$
  $d_7 = 1.50$
$r_8 = 724.782$
  $d_8 = 4.00$     $n_5 = 1.76180$     $\nu_5 = 27.1$
$r_9 = -51.197$
  $d_9 = 1.50$     $n_6 = 1.62299$     $\nu_6 = 58.1$
$r_{10} = 68.079$
  $d_{10} = 4.50$
$r_{11} = -46.316$
  $d_{11} = 1.70$     $n_7 = 1.56384$     $\nu_7 = 60.8$
$r_{12} = -362.073$
  $d_{12} = D_2$
$r_{13} = 169.497$
  $d_{13} = 5.50$     $n_8 = 1.61800$     $\nu_8 = 63.4$
$r_{14} = -35.277$
  $d_{14} = 1.50$     $n_9 = 1.72342$     $\nu_9 = 38.0$
$r_{15} = -89.281$
  $d_{15} = D_3$
$r_{16} = 38.913$
  $d_{16} = 5.67$     $n_{10} = 1.49831$     $\nu_{10} = 65.0$
$r_{17} = -1163.867$
  $d_{17} = 0.60$
$r_{18} = 32.727$
  $d_{18} = 8.61$     $n_{11} = 1.54739$     $\nu_{11} = 53.6$
$r_{19} = -115.565$
  $d_{19} = 0.93$
$r_{20} = -107.421$
  $d_{20} = 2.52$     $n_{12} = 1.80610$     $\nu_{12} = 40.9$
$r_{21} = 26.470$
  $d_{21} = 39.00$
$r_{22} = 101.950$
  $d_{22} = 7.17$     $n_{13} = 1.59551$     $\nu_{13} = 39.2$
$r_{23} = -38.878$
  $d_{23} = 0.99$
$r_{24} = -36.391$
  $d_{24} = 2.05$     $n_{14} = 1.72000$     $\nu_{14} = 43.7$
$r_{25} = 68.425$
  $d_{25} = 7.50$
$r_{26} = 73.111$
  $d_{26} = 5.61$     $n_{15} = 1.55671$     $\nu_{15} = 58.6$
$r_{27} = -107.040$

| f | $D_1$ | $D_2$ | $D_3$ |
|---|---|---|---|
| 87.0 | 2.46 | 44.40 | 15.49 |
| 151.4 | 32.07 | 27.39 | 2.89 |
| 250.0 | 47.85 | 1.34 | 13.16 |

$f_1 = 126.05$     $f_2 = -40.00,$     $f_3 = 115.05$
$f_4 = 138.20$ where reference symbols $r_1$ through $r_{27}$ represent radii of curvature of successive lenses, reference symbols $d_1$ through $d_{26}$ represent thickness of successive lenses and distances between lenses on the axis, reference symbols $n_1$ through $n_{15}$ represent refractive indexes of successive lenses, $\nu_1$ through $\nu_{15}$ represent Abbe's number of successive lenses.

Furthermore, for the fourth lens group, i.e., the fixed relay lens system of each of the above-mentioned respective embodiments, the overall length (the distance from the first lens surface of the fourth lens group to the imaging plane), focal length $f_4$ and Petzval's sum are as follows.

|  | Overall length | $f_4$ | Petzval's sum |
|---|---|---|---|
| Embodiment 1 | 135.17 | 138.20 | 0.732 |
| Embodiment 2 | 138.03 | 138.25 | 0.734 |
| Embodiment 3 | 138.01 | 138.20 | 0.768 |

As described in the above, lens systems according to respective embodiments all satisfy the afore-mentioned respective conditions and, at the same time, are arranged as follows. That is, for every embodiment, a lens group having an extremely small focal length and having functions as a concave lens is used as the second lens group. Besides, the fourth lens group, i.e., the relay lens system is arranged by six lenses positioned adequately and has Petzval's sum of large positive value which is required to offset Petzval's sum of negative value caused in the second lens group. Therefore, as the lens system as a whole, it is also possible to provide an extremely compact telephoto-type zoom lens system for which quality of the image is very high as shown by graphs of aberration curves and for which the telephoto ratio is smaller than 1.

The above fact also shows that the lens system which has the first lens group satisfying the afore-mentioned respective conditions, is capable of constituting an extremely compact zoom lens system for which quality of the image is very high over the whole zooming range and whole focusing range.

Figure 4A:
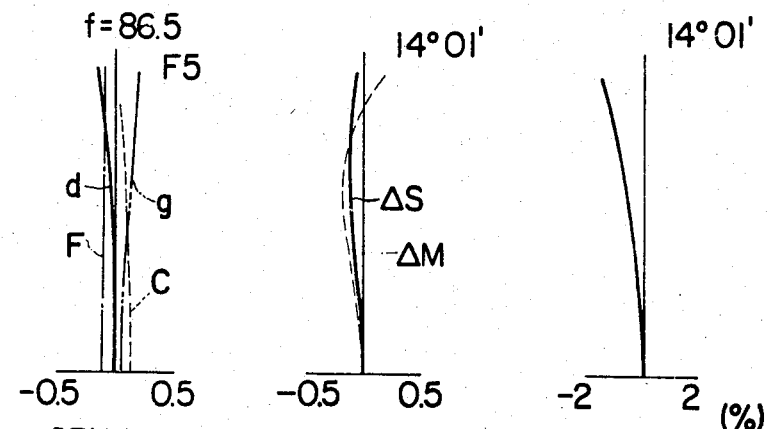
FIGS. 4A, 4B, 4C, 5A, 5B and 5C respectively show graphs of aberration curves of the Embodiment 1 of the present invention.
Figure 4B:
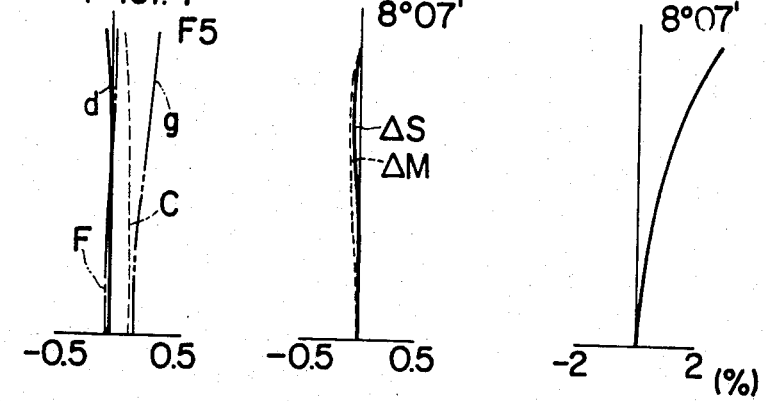
Figure 4C:
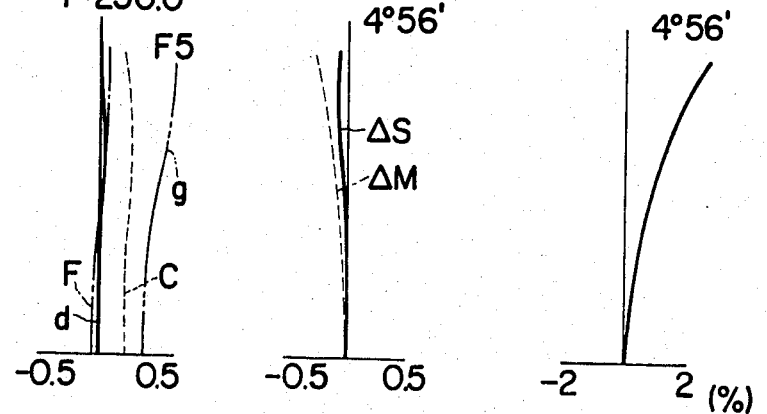
Figure 5A:
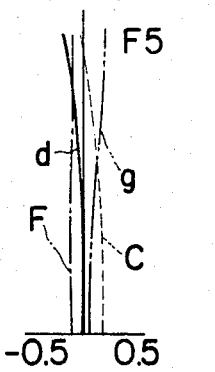
Figure 5A:
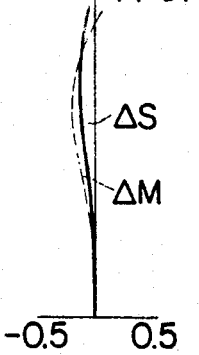
Figure 5A:
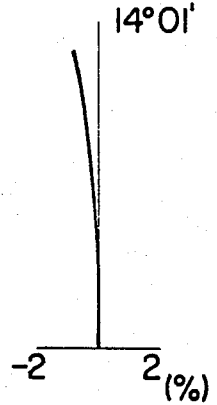
Figure 5B:
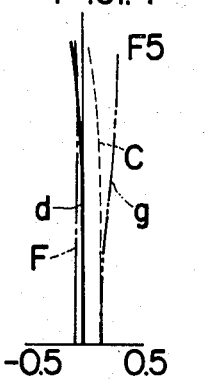
Figure 5B:
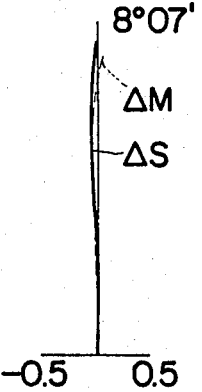
Figure 5B:
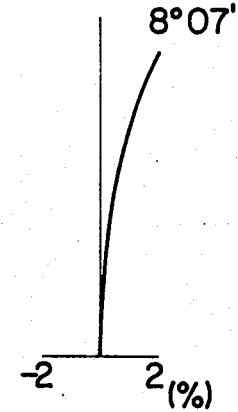
Figure 5C:
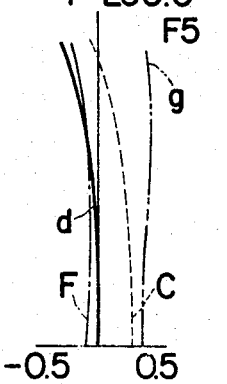
Figure 5C:
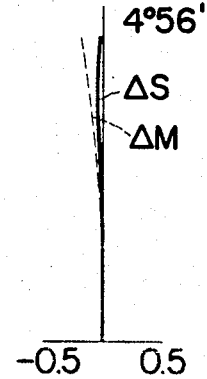
Figure 5C:
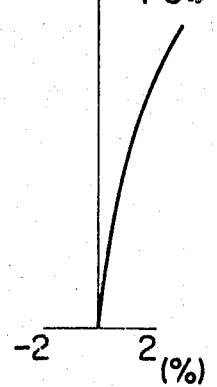
Figure 6A:
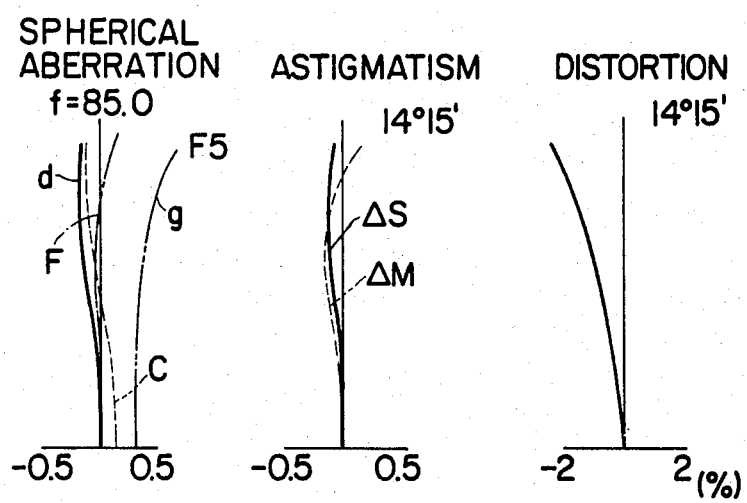
FIGS. 6A, 6B, 6C, 7A, 7B and 7C respectively show graphs of aberration curves of the Embodiment 2 of the present invention.
Figure 6B:
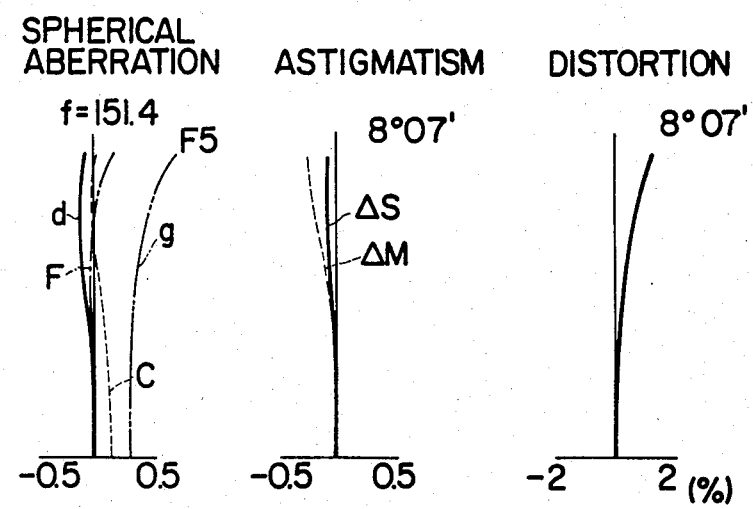
Figure 6C:
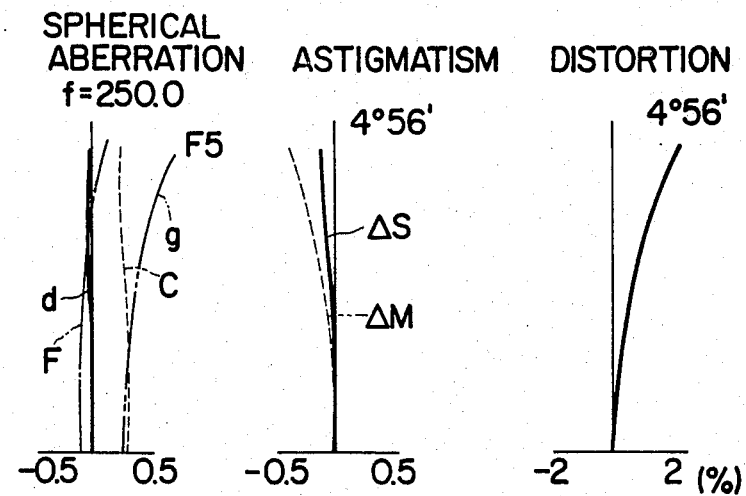
Figure 7A:
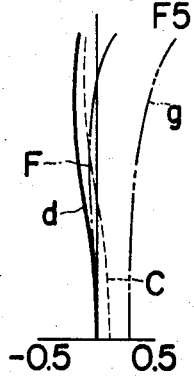
Figure 7A:
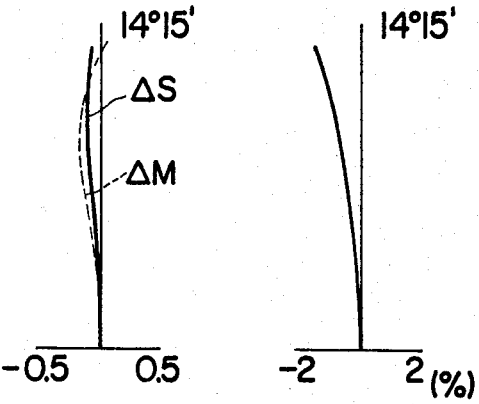
Figure 7B:
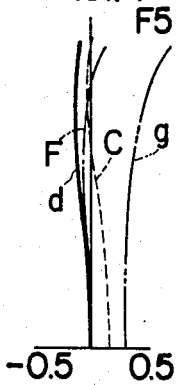
Figure 7B:
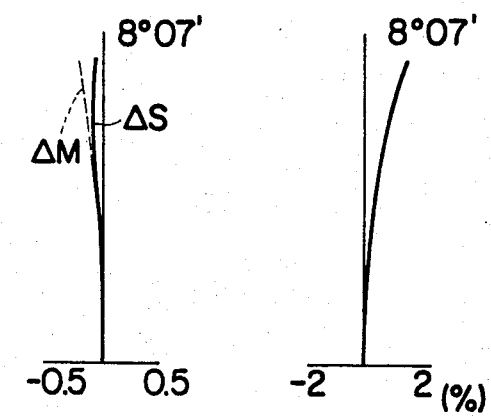
Figure 7C:
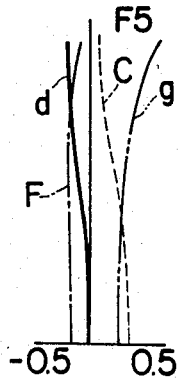
Figure 7C:
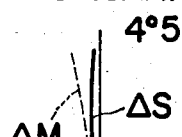
Figure 7C:
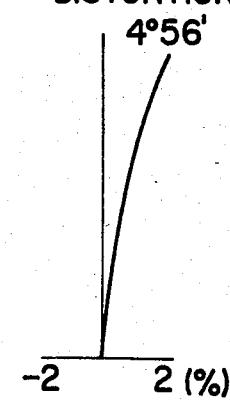
Figure 8A:
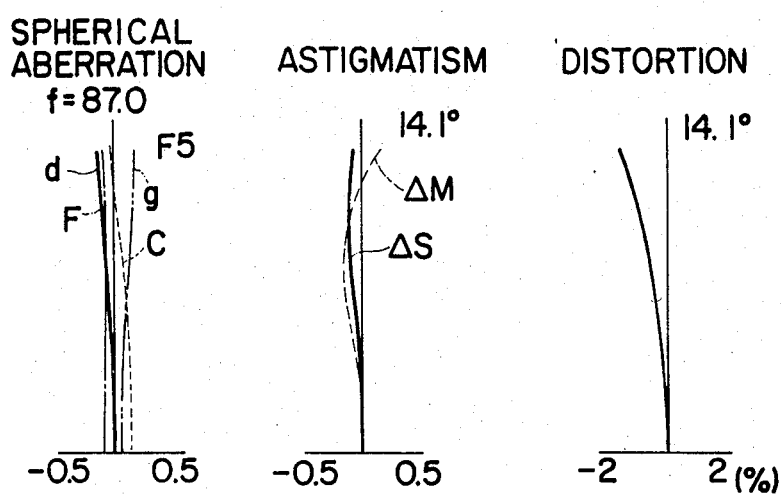
FIGS. 8A, 8B, 8C, 9A, 9B and 9C respectively show graphs of aberration curves of the Embodiment 3 of the present invention.
Figure 8B:
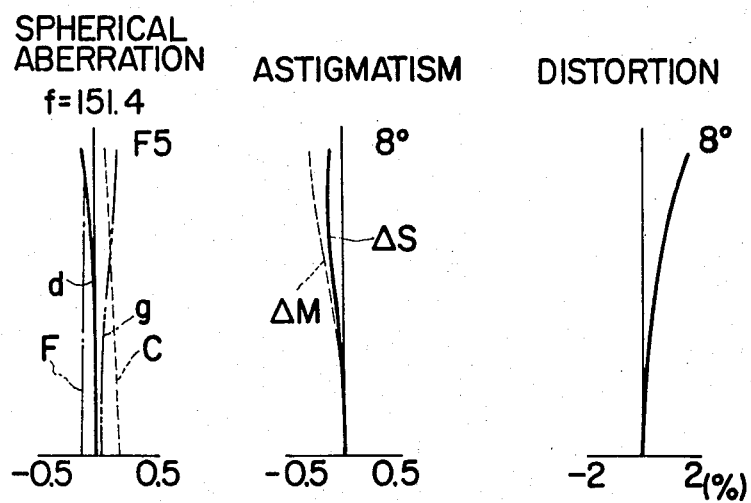
Figure 8C:
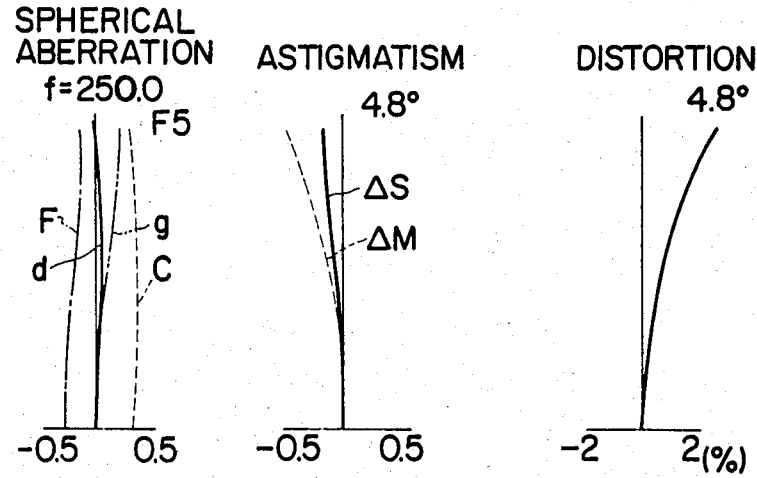
Figure 9A:
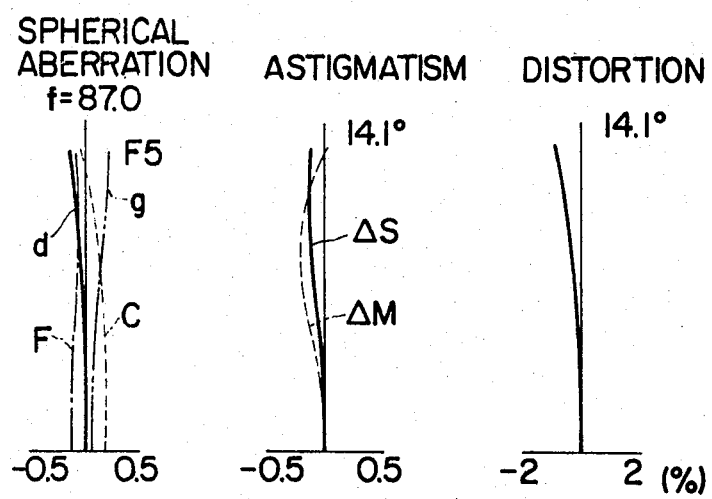
Figure 9B:
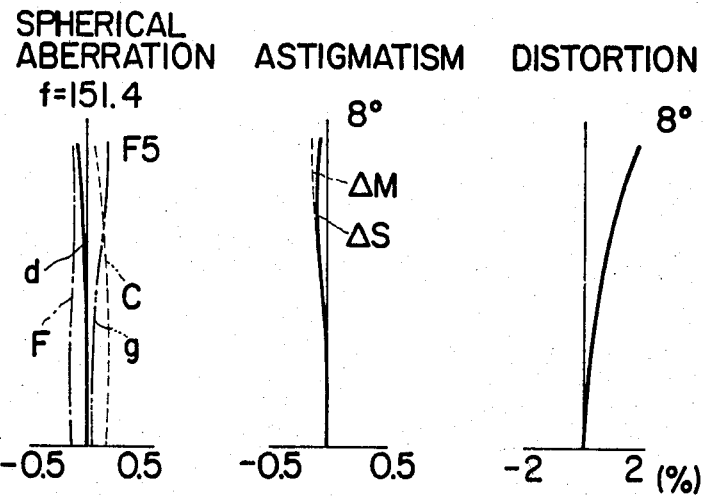
Figure 9C:
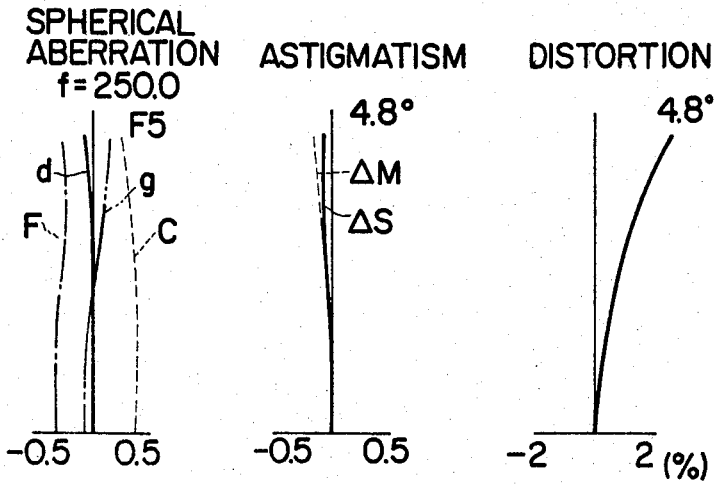

Out of graphs of aberration curves, FIG. 4A shows spherical aberration, astigmatism and distortion of the lens system according to the Embodiment 1 when the photographing distance is infinite and the focal length of the lens system is 86.5. FIG. 4B shows said aberrations of the Embodiment 1 when the photographing distance is also infinite, but when the focal length is 151.4. FIG. 4C shows said aberrations of the Embodiment 1 when the photographing distance is also infinite, but when the focal length is 250.0. FIG. 5A shows said aberrations of the Embodiment 1 when the photographing distance is 3 m and the focal length is 86.5. FIG. 5B shows said aberrations of the Embodiment 1 when the photographing distance is also 3 m, but when the focal length is 151.4. FIG. 5C shows said aberrations of the Embodiment 1 when the photographing distance is also 3 m, but when the focal length is 250.0. FIG. 6A shows said aberrations of the lens system according to the Embodiment 2 when the photographing distance is infinite and the focal length is 86.5. FIG. 6B shows said aberrations of the Embodiment 2 when the photographing distance is also infinite, but when the focal length is 151.4. FIG. 6C shows said aberrations of the Embodiment 2 when the photographing distance is also infinite, but when the focal length is 250.0. FIG. 7A shows said aberrations of the Embodiment 2 when the photographing distance is 3 m and the focal length is 86.5. FIG. 7B shows said aberrations of the Embodiment 2 when the photographing distance is also 3 m, but when the focal length is 151.4. FIG. 7C shows said aberrations of the Embodiment 2 when the photographing distance is also 3 m, but when the focal length is 250.0. FIG. 8A shows said aberrations of the lens system according to the Embodiment 3 when the photographing distance is infinite and the focal length is 86.5. FIG. 8B shows said aberrations of the Embodiment 3 when the photographing distance is also infinite, but when the focal length is 151.4. FIG. 8C shows said aberrations of the Embodiment 3 when the photographing distance is also infinite, but when the focal length is 250.0. FIG. 9A shows said aberrations of the Embodiment 3 when the photographing distance is 3 m and the focal length is 86.5. FIG. 9B shows said aberrations of the Embodiment 3 when the photographing distance is also 3 m, but when the focal length is 151.4. FIG. 9C shows said aberrations of the Embodiment 3 when the photographing distance is also 3 m, but when the focal length is 250.0.

I claim:

1. A telephoto-type zoom lens system comprising a varifocal afocal system and a fixed relay lens system; said varifocal afocal lens system comprising a first lens group being utilized for focusing and having function as a convex lens, a second lens group having function as a concave lens, and a third lens group having function as a convex lens; said fixed relay lens system comprising a fourth lens group; said first lens group comprising two lens components of which the first lens component is a biconvex lens and the second lens component is a cemented doublet lens consisting of a biconvex lens and biconcave lens; said second lens group comprising three lens components of which the first lens component is a concave lens, the second lens component is a cemented doublet lens and the third lens component is a concave lens; said third lens group comprising a cemented doublet lens; said fourth lens group comprising five lens components of which the first lens component is a convex lens, the second lens component is a lens component having negative power, the third lens component is a convex lens, the fourth lens component is a concave lens and the fifth lens component is a convex lens; said telephoto-type zoom lens system further satisfying the following conditions:

$$0.36 < \frac{n_1 - 1}{r_1} f_1 < 0.45 \qquad (1)$$

$$0.45 < -\frac{r_1}{r_2} < 0.60 \qquad (2)$$

$$0.64 < \frac{n_2 - 1}{r_3} f_1 < 0.66 \qquad (3)$$

$$0.15 < \frac{n_3 - 1}{r_5} f_1 < 0.20 \qquad (4)$$

wherein reference symbol $f_1$ represents the focal length of said first lens group, reference symbols $r_1$ and $r_2$ respectively represent radii of curvature of front and rear surfaces of the first lens component of said first lens group, reference symbols $r_3$ and $r_5$ respectively represent radii of curvature of the surface on the object side and surface on the image side of the second lens component of said first lens group, and reference symbol $n_1$, $n_2$ and $n_3$ respectively represent refractive indexes of respective lenses of said first lens group.

2. A telephoto-type zoom lens system according to claim 1 in which said telephoto-type zoom lens system further has the following numerical data:

```
f = 86.5 ~ 250.0
F = 1 : 5
l = 232.49
p : 0.93
r₁ = 138.961
    d₁ = 6.25       n₁ = 1.48749      ν₁ = 70.2
r₂ = −306.308
    d₂ = 0.58
r₃ = 122.382
    d₃ = 5.78       n₂ = 1.62299      ν₂ = 58.1
r₄ = −221.461
    d₄ = 2.40       n₃ = 1.78472      ν₃ = 25.7
r₅ = 504.707
    d₅ = variable
r₆ = −738.315
    d₆ = 1.70       n₄ = 1.56873      ν₄ = 63.2
r₇ = 75.815
    d₇ = 1.50
r₈ = 718.424
    d₈ = 4.00       n₅ = 1.76180      ν₅ = 27.1
r₉ = −52.778
    d₉ = 1.50       n₆ = 1.62299      ν₆ = 58.1
r₁₀ = 67.332
    d₁₀ = 4.50
r₁₁ = −46.001
    d₁₁ = 1.70      n₇ = 1.56384      ν₇ = 60.8
r₁₂ = −253.441
    d₁₂ = variable
r₁₃ = 177.012
    d₁₃ = 5.50      n₈ = 1.61800      ν₈ = 63.4
r₁₄ = −35.277
    d₁₄ = 1.50      n₉ = 1.72342      ν₉ = 38.0
r₁₅ = −87.628
    d₁₅ = variable
r₁₆ = 39.044
    d₁₆ = 5.67      n₁₀ = 1.49831     ν₁₀ = 65.0
r₁₇ = −1006.691
    d₁₇ = 0.60
r₁₈ = 32.847
    d₁₈ = 8.61      n₁₁ = 1.54739     ν₁₁ = 53.6
r₁₉ = −115.909
    d₁₉ = 0.91
r₂₀ = −107.102
    d₂₀ = 2.52      n₁₂ = 1.80610     ν₁₂ = 40.9
r₂₁ = 26.393
    d₂₁ = 39.00
r₂₂ = 101.736
    d₂₂ = 7.17      n₁₃ = 1.59551     ν₁₃ = 39.2
r₂₃ = 38.824
    d₂₃ = 1.50
r₂₄ = −36.459
    d₂₄ = 2.00      n₁₄ = 1.72000     ν₁₄ = 43.7
r₂₅ = 68.595
    d₂₅ = 3.50
r₂₆ = 72.873
    d₂₆ = 5.61      n₁₅ = 1.55671     ν₁₅ = 58.6
r₂₇ = −115.433
``` wherein reference symbols $r_1$ through $r_{27}$ represent radii of curvature of successive lenses, reference symbols $d_1$ through $d_{26}$ represent thickness of successive lenses and distances between lenses on the axis, reference symbols $n_1$ through $n_{15}$ represent refractive indexes of successive lenses, $\nu_1$ through $\nu_{15}$ represent Abbe's number of successive lenses.

3. A telephoto-type zoom lens system according to claim 1 in which said telephoto-type zoom lens system further has the following numerical data:

```
f = 85.0 ~ 250.0
F = 1 : 5
l = 238.36
p = 0.95
r₁ = 152.515
    d₁ = 6.27       n₁ = 1.48749      ν₁ = 70.2
r₂ = −291.307
    d₂ = 0.59
r₃ = 121.674
    d₃ = 5.80       n₂ = 1.62041      ν₂ = 60.3
r₄ = −222.315
    d₄ = 2.41       n₃ = 1.78472      ν₃ = 25.7
r₅ = 583.052
    d₅ = variable
r₆ = −569.430
    d₆ = 1.70       n₄ = 1.56873      ν₄ = 63.2
r₇ = 83.352
    d₇ = 2.00
r₈ = ∞
    d₈ = 4.00       n₅ = 1.76182      ν₅ = 26.6
r₉ = −52.450
    d₉ = 1.50       n₆ = 1.61800      ν₆ = 63.4
r₁₀ = 69.088
    d₁₀ = 4.51
r₁₁ = −47.831
    d₁₁ = 1.7       n₇ = 1.56873      ν₇ = 63.2
r₁₂ = −267.438
    d₁₂ = variable
r₁₃ = 158.234
    d₁₃ = 5.52      n₈ = 1.62012      ν₈ = 49.7
r₁₄ = −35.438
    d₁₄ = 1.51      n₉ = 1.72151      ν₉ = 29.2
r₁₅ = −94.092
    d₁₅ = variable
r₁₆ = 42.042
    d₁₆ = 5.67      n₁₀ = 1.49831     ν₁₀ = 65.0
r₁₇ = −325.217
    d₁₇ = 0.60
r₁₈ = 37.123
    d₁₈ = 10.60     n₁₁ = 1.54739     ν₁₁ = 53.6
r₁₉ = −107.794
    d₁₉ = 2.52      n₁₂ = 1.80610     ν₁₂ = 40.9
r₂₀ = 28.663
    d₂₀ = 39.00
r₂₁ = 100.383
    d₂₁ = 7.17      n₁₃ = 1.59551     ν₁₃ = 39.2
r₂₂ = −43.650
    d₂₂ = 3.00
r₂₃ = −38.740
    d₂₃ = 2.05      n₁₄ = 1.72000     ν₁₄ = 43.7
r₂₄ = 91.922
    d₂₄ = 7.50
r₂₅ = 78.964
    d₂₅ = 6.00      n₁₅ = 1.56384     ν₁₅ = 60.8
r₂₆ = −200.325
``` wherein reference symbols $r_1$ through $r_{26}$ represent radii of curvature of successive lenses, reference symbols $d_1$ through $d_{25}$ represent thickness of successive lenses and distance between lenses on the axis, reference symbols $n_1$ through $n_{15}$ represent refractive indexes of successive lenses, $\nu_1$ through $\nu_{15}$ represent Abbe's number of successive lenses.

4. A telephoto-type zoom lens system according to claim 1 in which said telephoto-type zoom lens system further has the following numerical data:

```
f = 87.0 ~ 250.0
l = 237.27
[F − 1 : 5]        F = 1 : 5
[p = 9.95]         p = 0.95
r₁ = 168.255
    d₁ = 6.25       n₁ = 1.48749      ν₁ = 70.2
r₂ = −281.979
    d₂ = 0.58
r₃ = 118.717
    d₃ = 5.78       n₂ = 1.62041      ν₂ = 60.3
r₄ = −221.405
    d₄ = 2.40       n₃ = 1.78472      ν₃ = 25.7
r₅ = 660.538
    d₅ = variable
r₆ = −1282.312
    d₆ = 1.70       n₄ = 1.56873      ν₄ = 63.2
r₇ = 76.677
    d₇ = 1.50
r₈ = 724.782
    d₈ = 4.00       n₅ = 1.76180      ν₅ = 27.1
r₉ = −51.197
    d₉ = 1.50       n₆ = 1.62299      ν₆ = 58.1
r₁₀ = 68.079
    d₁₀ = 4.50
r₁₁ = −46.316
    d₁₁ = 1.70      n₇ = 1.56384      ν₇ = 60.8
r₁₂ = −362.073
    d₁₂ = variable
r₁₃ = 169.497
    d₁₃ = 5.50      n₈ = 1.61800      ν₈ = 63.4
r₁₄ = −35.227
    d₁₄ = 1.50      n₉ = 1.72342      ν₉ = 38.0
```

-continued $r_{15} = -89.281$
$d_{15} = $ variable
$r_{16} = 38.913$
$d_{16} = 5.67$    $n_{10} = 1.49831$    $\nu_{10} = 65.0$
$r_{17} = -1163.867$
$d_{17} = 0.60$
$r_{18} = 32.727$
$d_{18} = 8.61$    $n_{11} = 1.54739$    $\nu_{11} = 53.6$
$r_{19} = -115.565$
$d_{19} = 0.93$
$r_{20} = -107.421$
$d_{20} = 2.52$    $n_{12} = 1.80610$    $\nu_{12} = 40.9$
$r_{21} = 26.470$
$d_{21} = 39.00$
$r_{22} = 101.950$
$d_{22} = 7.17$    $n_{13} = 1.59551$    $\nu_{13} = 39.2$
$r_{23} = -38.878$
$d_{23} = 0.99$ -continued $r_{24} = -36.391$
$d_{24} = 2.05$    $n_{14} = 1.72000$    $\nu_{14} = 43.7$
$r_{25} = 68.425$
$d_{25} = 7.50$
$r_{26} = 73.111$
$d_{26} = 5.61$    $n_{15} = 1.55671$    $\nu_{15} = 58.6$
$r_{27} = -107.040$ wherein reference symbols $r_1$ through $r_{27}$ represent radii or curvature of successive lenses, reference symbols $d_1$ through $d_{26}$ represent thickness of successive lenses and distances between lenses on the axis, reference symbols $n_1$ through $n_{15}$ represent refractive indexes of successive lenses, $\nu_1$ through $\nu_{15}$ represent Abbe's number of successive lenses.

* * * * *